United States Patent [19]

Brose et al.

[11] Patent Number: 4,822,383

[45] Date of Patent: Apr. 18, 1989

[54] METHOD AND APPARATUS FOR REMOVING CARBON DIOXIDE FROM AIR

[75] Inventors: Harlan F. Brose, East Hartland; Alfred O. Brouillet, Somers, both of Conn.

[73] Assignee: United Technologies Corporation, Hartford, Conn.

[21] Appl. No.: 44,091

[22] Filed: Apr. 30, 1987

[51] Int. Cl.[4] .............................................. B01D 53/04
[52] U.S. Cl. ........................................ 55/33; 55/58; 55/62; 55/68
[58] Field of Search ................. 423/228, 230; 55/33, 55/58, 62, 68

[56] References Cited

U.S. PATENT DOCUMENTS

| | | | |
|---|---|---|---|
| 3,024,867 | 3/1962 | Milton | 183/114.2 |
| 3,078,634 | 2/1963 | Milton | 55/33 |
| 3,164,453 | 1/1965 | Milton | 55/35 |
| 3,193,985 | 7/1965 | Siggelin | 55/33 |
| 3,221,477 | 12/1965 | Arnoldi et al. | 55/31 |
| 3,242,651 | 3/1966 | Arnoldi | 55/179 |
| 3,243,938 | 4/1966 | Lavery et al. | 55/62 |
| 3,338,030 | 8/1967 | Feldbauer | 55/62 |
| 3,355,860 | 12/1967 | Arnoldi | 55/31 |
| 3,359,707 | 12/1967 | Jean | 55/33 |
| 3,533,221 | 10/1970 | Tamura | 55/33 |
| 3,534,529 | 10/1970 | Mattia | 55/62 |
| 3,594,983 | 7/1971 | Yearout | 55/33 |
| 3,719,025 | 3/1973 | Heinze et al. | 55/31 |
| 3,738,084 | 6/1973 | Simonet et al. | 55/31 |
| 3,808,773 | 5/1974 | Reyhing et al. | 55/31 |
| 3,859,417 | 1/1975 | Teller | 423/23 C |
| 3,935,294 | 1/1976 | Teller | 423/231 |
| 4,233,038 | 11/1980 | Tao | 55/33 |
| 4,238,463 | 12/1980 | Nicksic | 423/231 |
| 4,249,915 | 2/1981 | Sircar et al. | 55/26 |
| 4,285,918 | 8/1981 | Gustafson | 423/228 |
| 4,515,605 | 5/1985 | Inoue et al. | 55/26 |
| 4,522,793 | 6/1985 | Larson et al. | 423/230 |

FOREIGN PATENT DOCUMENTS

| | | | |
|---|---|---|---|
| 1619855 | 9/1967 | Fed. Rep. of Germany | 423/229 |
| 1227820 | 4/1985 | Japan | 423/228 |
| 0762943 | 6/1977 | U.S.S.R. | 423/230 |

Primary Examiner—John Doll
Assistant Examiner—Lori S. Freeman
Attorney, Agent, or Firm—Lloyd D. Doigan

[57] ABSTRACT

A method and apparatus for removing carbon dioxide from a body of air by using a regenerative solid amine material arranged in beds 14(A–D) is disclosed. Air is directed through a first bed to adsorb the carbon dioxide theefrom. Steam is impelled by a compressor (24) into the first bed to desorb that bed, the steam forming a condensate on that bed. The compressor then creates a vacuum in the first bed which vaporizes the condensate therein, dewatering the first bed so that it may be reused to adsorb carbon dioxide. The compressor impels the vaporized condensate into a second bed to desorb the adsorbed carbon dioxide in the second bed.

10 Claims, 2 Drawing Sheets

METHOD AND APPARATUS FOR REMOVING CARBON DIOXIDE FROM AIR

DESCRIPTION

1. Technical Field

This invention relates to a carbon dioxide removal system and more particularly to a carbon dioxide removal system that uses regenerative material.

2. Background Art

Carbon dioxide removal systems utilize regenerative materials such as solid amine. The surfaces of the solid amine material adsorb carbon dioxide from a body of air by forming a weak chemical bond with the carbon dioxide. The bond is broken, desorbing the carbon dioxide, by applying heat to the solid amine. Typically, heat is applied by subjecting the solid amine to steam. The steam condenses on the solid amine, giving up its heat thereby breaking the carbon dioxide solid amine bond. Because the steam condenses upon the solid amine, there is very little mixture of the unbonded carbon dioxide and the steam so that the unbonded carbon dioxide may readily be removed.

In a typical solid amine system, a bed of solid amine adsorbs carbon dioxide from the air while another bed is being desorbed of its carbon dioxide. After a bed has been desorbed of its carbon dioxide by the application of steam, the condensate formed on the solid amine must be removed (dewatered) so that the bed may again adsorb carbon dioxide. A process of adsorbing carbon dioxide in one bed while desorbing carbon dioxide and dewatering condensate in another bed carries on continuously to remove carbon dioxide from the body of air.

These prior art regeneration systems require a great deal of energy. Steam is generated to desorb each bed. Each desorbed bed is then dewatered to remove the condensate formed thereon. The dewatering process entrains water vapor formed from the condensate in the air. The entrained water vapor is removed from the air by a condensor to prevent the humidity of the body of air from rising to uncomfortable levels. The steam generator, the dewatering process, and the condensor require a great deal of energy.

DISCLOSURE OF THE INVENTION

It is an object of the invention to provide a regenerative carbon dioxide removal system which is economical to run by reusing the steam used to desorb one bed to desorb other beds.

According to the invention, a method and apparatus for removing a gaseous component from air utilizes a plurality of beds each bed having three states, an adsorption state wherein the bed adsorbs said gaseous compenent from air, a desorption state wherein a regenerative gas such as team desorbs the gaseous component from the bed, the gas forming a condensate in the bed while it desorbs the bed, and a dewatering state wherein the condensate is removed from the bed. The method is characterized by lowering the pressure within a bed in the dewatering state to vaporize the condensation, moving the vaporized condensation into a bed in a desorption state to desorb the carbon dioxide from the bed, and admitting air into a bed in an adsorption state to remove the carbon dioxide from the air.

The apparatus is characterized as having a means such as a compressor for simultaneously lowering the pressure in a bed in the dewatering state to vaporize the condensation on the bed and for moving the vaporized condensation into a bed in a desorption state to desorb the gaseous component from that bed, and a means for admitting air into a bed in a adsorption state to remove the carbon dioxide from the air.

The foregoing and other objects, features and advantages, of the present invention will become more apparent in light of the detailed description of a best mode embodiment thereof, as illustrated in the accompanying drawing.

BEST MODE FOR CARRYING OUT THE INVENTION

Figure 1:
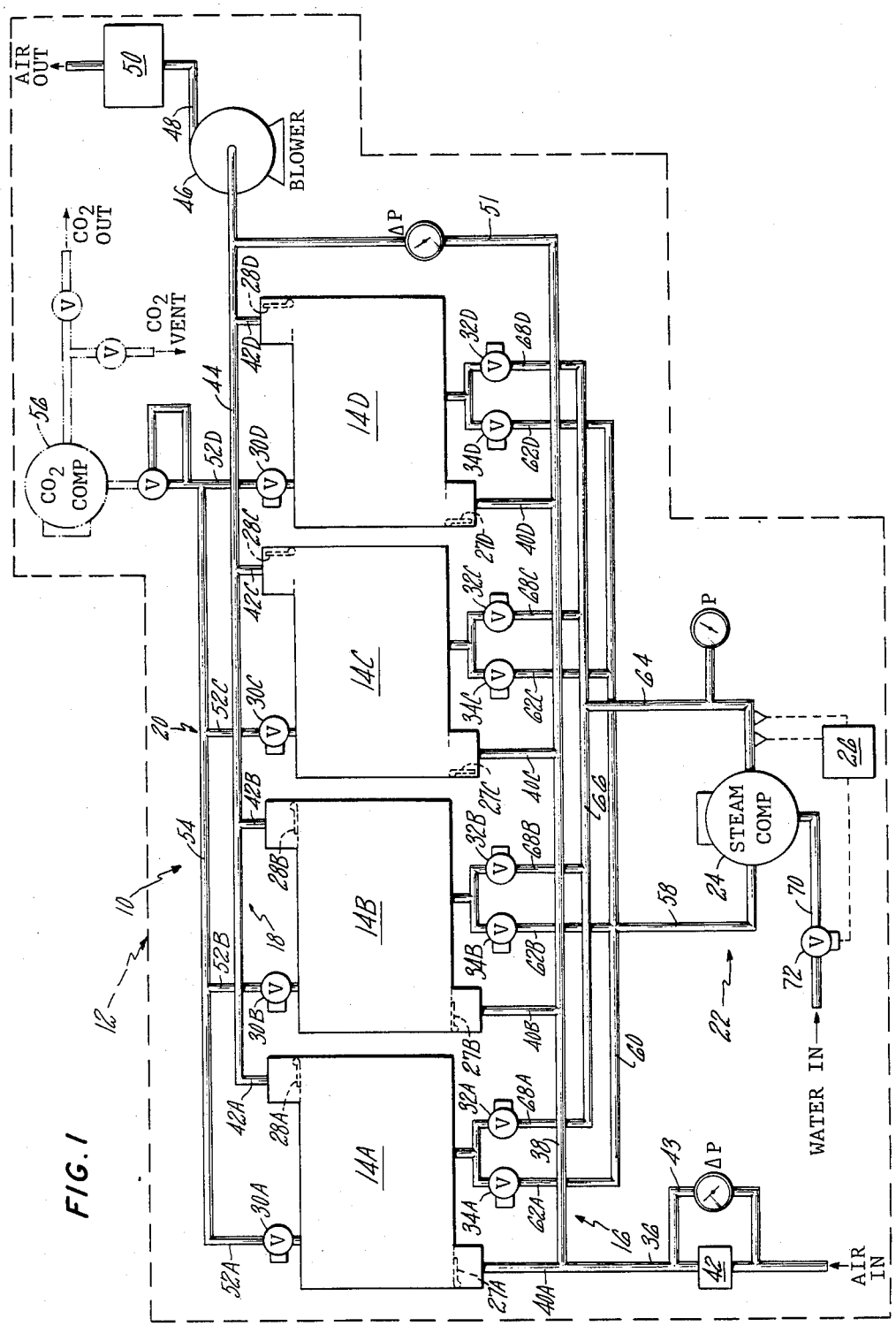
FIG. 1 is a schematic embodiment of the carbon dioxide regeneration system of the invention.

Referring to FIG. 1, the best mode embodiment of the regenerative carbon dioxide removal system 10 is shown. The system shown is designed for continuously removing carbon dioxide from a closed body 12 of air such as in a submarine. However, one of ordinary skill in the art would readily recognize that such a system has other closed atmosphere applications.

The system shown has several components including: A plurality of solid amine beds 14 (A–D) for removing carbon dioxide from the body 12 air, an air inlet system 16 for introducing air from an enclosed body of air into the beds, an air outlet system 18 for reintroducing filtered air passing from the beds back into the body of air, a carbon dioxide system 20 for removing desorbed carbon dioxide from the beds, a steam system 22 including a compressor 24 for routing steam to each of the beds to desorb and to dewater the beds, and a controller 26 which controls the routing of air, steam, and carbon dioxide from and to each bed to operate the system as will be discussed infra.

Four beds 14(A–D) of solid amine material are schematically shown. Each bed has five valves for controlling the flow of gases therethrough; an air inlet valve 27, an air outlet valve 28, a carbon dioxide valve 30, a steam inlet valve 32 and a vapor output valve 34. Each bed holds approximately 100 pounds of solid amine material at a density of approximately 35 pounds per cubic foot.

The air inlet system 16 channels carbon dioxide laden air to the beds. An inlet line 36 connects to a manifold 38 which is connected via lines 40(A–D) to the air inlet valve 27(A–D) of each bed respectively. A filter 42 is placed within the inlet line to remove particulates that may endanger health or damage the beds. A line 43 is provided to allow the air to bypass the filter should the filter become clogged.

Air is drawn through the beds by an outlet system 18. Each outlet valve 28 (A–D) connects via line 42(A–D) to an output manifold 44. A blower motor 46 pulls air from each bed through the exhaust manifold 44 for return back to the body of air. The air is generally channeled from the blower via line 48 through a sound suppressor 50 to baffle noise created within the system. Line 51 is provided between manifold 38 and output manifold 44 to provide a check of the pressure drop across the beds to ensure proper system operation.

Each carbon dioxide valve 30(A–D) connects via line 52(A–D) to a carbon dioxide manifold 54 for removing desorbed carbon dioxide from each bed. For certain applications, as in a submarine, the cargon dioxide may be pulled from each bed by a compressor 56 which compresses the gas for expulsion through the hull (not shown). In other applications, the carbon dioxide may be saved for reduction to its component elements or expulsed from the body of air without compression.

The core of the regenerative gas system is the compressor 24. The compressor connects via line 50 to a vapor manifold 60 which attaches to the vapor output valve 34(A-D) of each bed respectively via line 62(A-D). The output of the compressor is attached via line 64 to a steam manifold 66 which attaches via line 68(A-D) to the steam input valve of each bed. A water line 70 is attached to the steam compressor to provide cooling for the compressor and to make up for steam lost within the system as will be discussed infra.

The compressor 24 is designed to deliver 25 pounds of superheated steam, at 15.0±0.2 psia at 250±30° F. to desorb a bed of its carbon dioxide within an approximately ten minute period. Further, the compressor must be capable of pulling at least about 16.5 pounds of vapor off a bed being desorbed at a pressure of approximately 1.3 psia. Any compressor (as are well known in the art) that meets these criterion is acceptable. A carbon vane type compressor is preferred, though, as it is self-lubricating and thus not likely to introduce contaminates into the water. The water from line may be sprayed into a compressor inlet (not shown), sprayed into the compressor exhaust, evaporated in a jacket (not shown) around the compressor or any combination of these methods to cool the compressor. Spraying the water into the compressor inlet, however, is preferred. The steam created by cooling of the compressor is used to ensure that the steam exiting from the compressor is within the design criteria both in terms of the temperature and the weight of steam as detailed supra.

The controller 26 is provided to distribute the gases to the appropriate paths at the appropriate times and to supply water to the compressor for cooling and for replacing lost water vapor as will be discussed below.

During operation, each bed follows a continuous sequence of adsorption, desorption and dewatering etc. However, the sequential operation of each bed is staggered, from the other beds (see FIG. 2) so that the overall system may operate continuously.

The sequence for a bed (i.e., bed 14A) is as follows: The controller 26 directs the air inlet 27A and outlet valves 28A to open. The carbon dioxide valve 30A, the steam valve 32A and vapor valve 34A are all closed. The continuously operating blower 46 pulls carbon dioxide laden air from the body of air 12 through line 36, the bed 14A (which adsorbs carbon dioxide from the air), line 42A, the exhaust manifold 44 to be returned to the body of air.

After approximately 20 minutes the controller 26 closes the air inlet and outlet valves 27A, 28A and opens the steam valve 32A and the carbon dioxide valve 30A. The compressor impels a flow of steam through the steam manifold into the amine material within the bed. The steam condenses on the amine giving up its heat thereby desorbing the carbon dioxide. The carbon dioxide is drawn away from the bed through the open carbon dioxide valve, line 52A, and the carbon dioxide manifold by the carbon dioxide compressor. Because the steam generally condenses on the bed there is very little mixing with the desorbed carbon dioxide.

After approximately 10 minutes the controller 26 closes the carbon dioxide valve 30A and the steam valve 32A and opens the vapor valve 34A. The compressor creates a vacuum in the bed 14A through the open vapor valve, line 62A and vapor manifold 60. The vacuum (approximately 1.3 psia) causes the condensate formed on the bed 14A to vaporize. The vapor is pulled from the bed by the compressor effectively dewatering the bed. After approximately 10 minutes the sequence begins anew.

Figure 2:
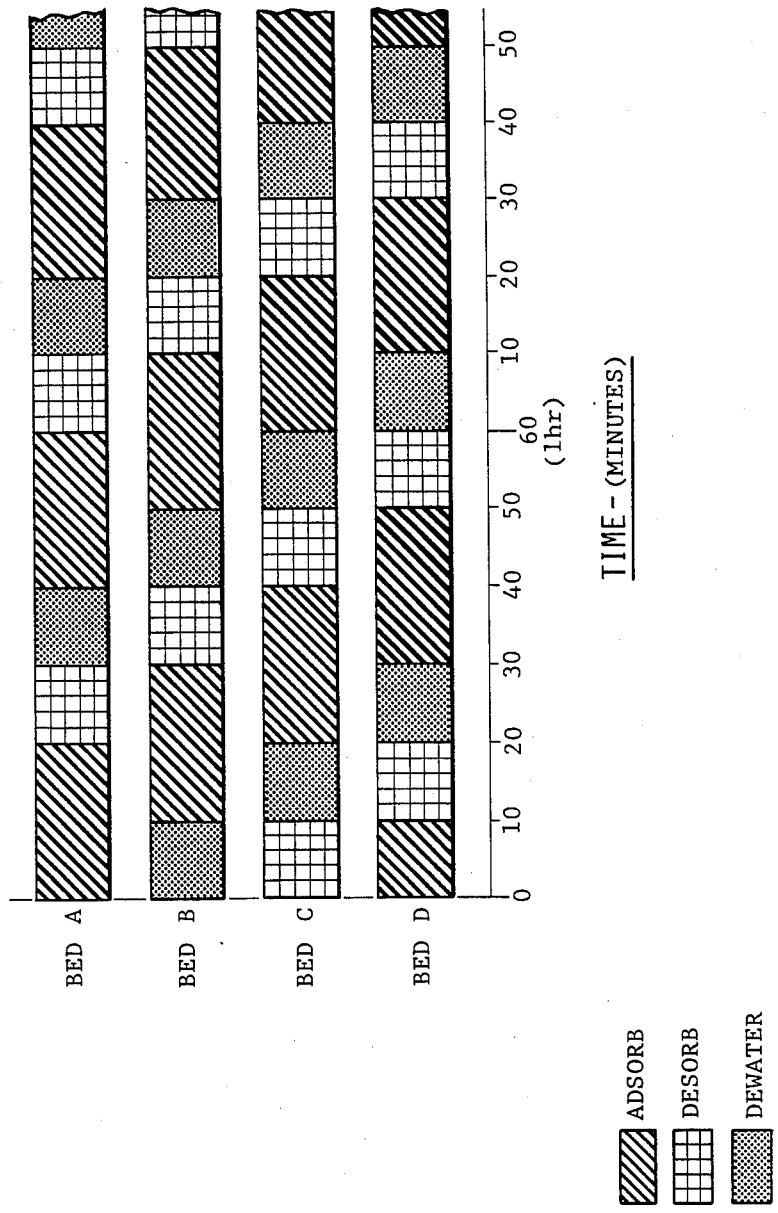
FIG. 2 is a graphical depiction of the cyclic operation profile of the invention.

As shown in FIG. 2, the sequential operation of each bed is staggered from the other beds so that the overall system operates continuously. For instance, in the first 10 minutes period beds 14A, 14D are adsorbing carbon dioxide while bed 14C is being desorbed and bed 14B is being dewatered. The compressor 24 simultaneously desorbs and dewaters by impelling vapor from a bed being dewatered to a bed being desorbed. Generally, the compressor pulls the 16.5 pounds of vapor from the bed being dewatered at a temperature somewhat less than that required to support steam at atmospheric pressure. The temperature and weight of the vapor is increased to simultaneously desorb bed 14C. The compressor compresses the vapor raising its temperature. The controller 26 senses the weight and temperature of the steam in line 64. The controller then regulates valve 72 to admit an amount of water to cool the compressor. The water is converted to steam as it cools the compressor and is added to the steam effluent in line 64 to ensure that 25 pounds of steam at about 250° F. is delivered to the bed 14C to be desorbed.

To startup the system, the controller operates valve 72 to feed water to the compressor 24 which, as above, is cooled thereby turning the water into steam. The system is run through several cycles until the compressor is able to deliver 25 pounds of steam to a bed at which point the system is fully operational.

By reusing the latent heat left by the condensed steam in each bed that has been desorbed, fewer BTUs are required to raise the temperature of the vaporized condensate to steam. The inefficiency and the work performed by the steam compressor is used to create the steam necessary to make up for water left within the solid amine beds. By reusing most of the water left in the solid amine bed, the condensor and dewatering process of the prior art is eliminated.

Although the invention has been shown and described with respect to a best mode embodiment thereof, it should be understood by those skilled in the art that the foregoing and various other changes, omissions, and additions in the form and detail thereof may be made therein without departing from the spirit and scope of the invention.

We claim:

1. A method for removing a gaseous component from air utilizing a plurality of beds, each bed having three states, a first state wherein said bed adsorbs said gaseous component from said air, a second state wherein a regenerative gas desorbs said gaseous component from said bed, said regenerative gas forming a condensate on said bed therewith and a third state wherein said condensate is removed from said bed, said method characterized by:

simultaneously lowering the pressure within a bed in said third state to vaporize said condensation and moving said vaporized condensate into a bed in said second state to desorb said gaseous component from said bed; and moving air through a bed in said first state to remove said gaseous component from said air.

2. The method of claim 1 including the step of heating said vaporized condensate while moving said vaporized condensate such that said vaporized condensate remains as a vapor at atmospheric pressure.

3. Method for continuously removing carbon dioxide from a body of air characterized by:
   (a) inducing air to flow from said body of air through a first bed of solid amine material, said solid amine material adsorbing carbon dioxide from said air;
   (b) inducing air to flow from said body of air through a second bed of solid amine material to prevent carbon dioxide saturation of said first amine bed, said solid amine material adsorbing carbon dioxide from said air;
   (c) introducing vapor into said first solid amine bed to desorb said carbon dioxide from said first amine bed said vapor forming a condensate on said first amine bed;
   (d) inducing air to flow from said body of air through a third bed of solid amine material to prevent carbon dioxide saturation of said second amine bed, said solid amine material adsorbing carbon dioxide from said air;
   (e) simultaneously vaporizing said condensate in said first solid amine bed and moving said vaporized condensate from said first solid amine bed to said second solid amine bed to desorb said carbon dioxide from said second solid amine bed said vapor forming a condensate on said second solid amine bed;
   (f) inducing air to flow from said body of air through said first dolid amine bed, said solid amine material adsorbing carbon dioxide from said air;
   (g) simultaneously vaporizing said condensate in said second solid amine bed and moving said vaporized condensate from said second solid amine bed to said third solid amine bed to desorb said carbon dioxide from said third solid amine bed said vaporized condensate forming a condensate on said third solid amine bed;
   (h) inducing air to flow from said body of air through said second solid amine bed, said solid amine material adsorbing carbon dioxide from said air;
   (i) simultaneously vaporizing said condensate in said third solid amine bed and moving said vaporized condensate from said third solid amine bed to said first solid amine bed to desorb said carbon dioxide from said first solid amine bed, said vaporized condensate forming a condensate on said first solid amine bed; and
   (j) repeating steps (d–j).

4. The method of claim 3 wherein said vaporizing is accomplished by introducing a vacuum into said beds.

5. The method of claim 3 wherein said moving of said vaporized condensate includes heating said vaporized condensate.

6. Method for continuously removing carbon dioxide from air utilizing a plurality of solid amine beds, the method being characterized by:
   (a) flowing air through a first bed of solid amine material, said first bed adsorbing carbon dioxide from said air and forming a first carbon dioxide depleted airstream thereby;
   (b) flowing said air through a second bed of solid amine material to adsorb carbon dioxide from said second airstream and forming a second carbon dioxide depleted airstream thereby;
   (c) introducing vapor into said first solid amine bed to desorb said carbon dioxide from said first amine bed, said vapor forming a condensate on said first amine bed;
   (d) flowing said air through a third bed of solid amine material to adsorb carbon dioxide from said air and forming a third carbon dioxide depleted airstream thereby;
   (e) simultaneously vaporizing said condensate in said first solid amine bed and moving said vaporized condensate from said first solid amine bed to said second solid amine bed to desorb said carbon dioxide from said second solid amine bed, said vapor forming a condensate on said second solid amine bed;
   (f) flowing said air through said first solid amine bed, said solid amine material adsorbing carbon dioxide from said airstream forming said first carbon dioxide depleted airstream thereby;
   (g) simultaneously vaporizing said condensate in said second solid amine bed and moving said vaporized condensate from said second solid amine bed to said third solid amine bed to desorb said carbon dioxide from said third solid amine bed, said vaporized condensate forming a condensate on said third solid amine bed;
   (h) flowing said air through said second solid amine bed, said solid amine material adsorbing carbon dioxide from said airstream forming said second carbon dioxide depleted airstream thereby;
   (i) simultaneously vaporizing said condensate in said third solid amine bed and moving said vaporized condensate from said third solid amine bed to said first solid amine bed to desorb said carbon dioxide from said first solid amine bed, said vaporized condensate forming a condensate on said first solid amine bed; and
   (j) repeating steps (d–j).

7. The method of claim 6 wherein said vaporizing is accomplished by introducing a vacuum into said beds.

8. The method of claim 6 wherein said moving of said vaporized condensate includes the step of heating said vaporized condensate.

9. A method for removing carbon dioxide from air utilizing a plurality of beds, each bed having three states, a first state wherein said bed adsorbs said carbon dioxide from said air, a second state wherein a regenerative gas desorbs said gaseous component from said bed, said regenerative gas forming a condensate on said bed therewith and a third state wherein said condensate is removed from said bed, said method characterized by:
   simultaneously lowering the pressure within a bed in said third state to vaporize said condensate and moving said vaporized condensate into a bed in said second state to desorb said carbon dioxide from said bed; and
   moving air through a bed in said first state to remove said carbon dioxide from said air.

10. The method of claim 9 including the step of heating said vaporized condensate while moving said vaporized condensate such that said vaporized condensate remains as a vapor at atmospheric pressure.

* * * * *